(12) United States Patent
Bonilla et al.

(10) Patent No.: US 11,974,198 B2
(45) Date of Patent: *Apr. 30, 2024

(54) ANALYZE POWER OUTLET HAVING AVAILABILITY NOTIFICATION

(71) Applicant: Hubbell Incorporated, Shelton, CT (US)

(72) Inventors: Nelson Bonilla, Shelton, CT (US); Shadi Alex AbuGhazaleh, Guilford, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,896

(22) Filed: Sep. 19, 2022

(65) Prior Publication Data
US 2023/0011338 A1   Jan. 12, 2023

Related U.S. Application Data

(63) Continuation of application No. 17/081,646, filed on Oct. 27, 2020, now Pat. No. 11,451,938, which is a
(Continued)

(51) Int. Cl.
*H04W 4/12* (2009.01)
*H01R 13/453* (2006.01)
(Continued)

(52) U.S. Cl.
CPC ............ *H04W 4/12* (2013.01); *H01R 13/453* (2013.01); *H01R 13/4534* (2013.01);
(Continued)

(58) Field of Classification Search
CPC ... H04W 4/12; H01R 13/453; H01R 13/4534; H01R 13/641; H01R 13/701; H01R 24/20; H04B 3/546
See application file for complete search history.

(56) References Cited

U.S. PATENT DOCUMENTS 4,075,617 A * 2/1978 Wireman ........... G08B 13/1409
340/687
4,855,719 A   8/1989 Posey
(Continued)

FOREIGN PATENT DOCUMENTS

| CN | 104467061 A | * 3/2015 | ............. B60L 1/006 |
| CN | 105284030 | 1/2016 | |
| GB | 2266015 | 10/1993 | |

OTHER PUBLICATIONS

PCT/US2016/067746 International Search Report and Written Opinion dated Mar. 31, 2017.
(Continued)

*Primary Examiner* — Jean F Duverne
(74) *Attorney, Agent, or Firm* — Robinson & Cole LLP

(57) ABSTRACT

A notification system including an outlet and a notification center. The outlet is configured to output a signal indicative of the availability of the outlet. The notification control unit is configured to receive the signal, determine availability of the outlet based on the signal, and output information corresponding to the availability of the outlet to at least one selected from a group consisting of a computer, a smart phone, and a tablet.

20 Claims, 11 Drawing Sheets

Related U.S. Application Data continuation of application No. 15/384,896, filed on Dec. 20, 2016, now Pat. No. 10,848,930.

(60) Provisional application No. 62/273,183, filed on Dec. 30, 2015.

(51) Int. Cl.
*H01R 13/641* (2006.01)
*H01R 13/70* (2006.01)
*H01R 24/20* (2011.01)
*H04B 3/54* (2006.01)

(52) U.S. Cl.
CPC ......... *H01R 13/641* (2013.01); *H01R 13/701* (2013.01); *H04B 3/546* (2013.01); *H01R 24/20* (2013.01)

(56) References Cited

U.S. PATENT DOCUMENTS

| | | | |
|---|---|---|---|
| 5,258,744 A | 11/1993 | Zeder | |
| 6,057,776 A | 5/2000 | Sargent | |
| 7,312,963 B1 | 12/2007 | Radosavljevic | |
| 7,588,447 B1 | 9/2009 | Ni | |
| 8,174,148 B2 | 5/2012 | Crucs | |
| 8,187,011 B1 | 5/2012 | Baldwin et al. | |
| 8,255,090 B2 | 8/2012 | Frader-Thompson | |
| 8,957,551 B1 | 2/2015 | Alberth, Jr. | |
| 9,190,782 B2 | 11/2015 | King | |
| 9,335,357 B2 | 5/2016 | Washiro | |
| 9,502,807 B2 | 11/2016 | Mortun | |
| 9,543,715 B2 | 1/2017 | Savicki, Jr. | |
| 9,548,574 B2 | 1/2017 | Hsu | |
| 9,563,792 B2 | 2/2017 | Allen | |
| 9,647,376 B2 | 5/2017 | Samojeden | |
| 9,712,068 B2 | 7/2017 | Suzuki | |
| 9,899,762 B2 | 2/2018 | Levine | |
| 10,038,283 B2 | 7/2018 | Oddsen | |
| 11,451,938 B2 * | 9/2022 | Bonilla | H01R 13/4534 |
| 2006/0240800 A1 | 10/2006 | Bannan | |
| 2007/0149013 A1 | 6/2007 | Easatham | |
| 2008/0248662 A1 | 10/2008 | Bazayev | |
| 2008/0258563 A1 | 10/2008 | Hodges | |
| 2009/0236115 A1 | 9/2009 | Li | |
| 2010/0041259 A1 | 2/2010 | Ni | |
| 2010/0130053 A1 | 5/2010 | Ziobro | |
| 2011/0136358 A1 | 6/2011 | Zhang | |
| 2011/0260555 A1 | 10/2011 | Mcginley | |
| 2015/0170060 A1 | 6/2015 | Blechner | |
| 2016/0127874 A1 | 5/2016 | Kingsmill | |

OTHER PUBLICATIONS

Chinese Patent Application No. 20168008064.6 First Office Action issued by the China National Intellectual Property Administration and translation, dated May 28, 2019 (20 pages).

Chinese Patent Application No. 20168008064.6 Second Office Action issued by the China National Intellectual Property Administration and translation, dated Jan. 16, 2020 (12 pages).

* cited by examiner

ANALYZE POWER OUTLET HAVING AVAILABILITY NOTIFICATION

RELATED APPLICATIONS

The present application claims priority to U.S. patent application Ser. No. 17/081,646, filed Oct. 27, 2020, which claims priority to U.S. patent application Ser. No. 15/384,896, filed Dec. 20, 2016, which claims priority to U.S. Provisional Application No. 62/273,183, filed Dec. 30, 2015, the entire contents of all of which are hereby incorporated.

TECHNICAL FIELD

The present invention relates to electrical power outlets, such as but not limited to, duplex outlets, Universal Serial Bus (USB) outlets, low-voltage outlets, and outlets having ground fault circuit interrupter (GFCI) protection.

SUMMARY

In one embodiment, the invention provides an electrical receptacle including an outlet, a shutter, and a switch. The outlet is configured to receive an electrical device. The shutter is configured to move from a first position to a second position when the electrical device is received. The switch is configured to output a signal when the shutter moves from the first position to the second position.

In another embodiment the invention provides an electrical receptacle including an outlet and a switch. The outlet is configured to receive an electrical device. The switch is configured to determine when the electrical device is received and output a signal when the electrical device is received.

In another embodiment the invention provides a notification system including an electrical receptacle and a notification control unit. The electrical receptacle includes an outlet configured to receive an electrical device and a switch. The switch is configured to determine when the electrical device is received and output a signal when the electrical device is received. The notification control unit is configured to receive the signal, determine a state of the electrical receptacle based on the signal, and output the state of the electrical receptacle.

In another embodiment the invention provides a method of providing an availability status of an electrical receptacle. The method including determining when the electrical receptacle receives an electrical device; outputting, from the electrical receptacle, a signal when the electrical device is received; determining, via a processing unit, the availability status the electrical receptacle; and outputting the availability status to a user device.

Other aspects of the invention will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
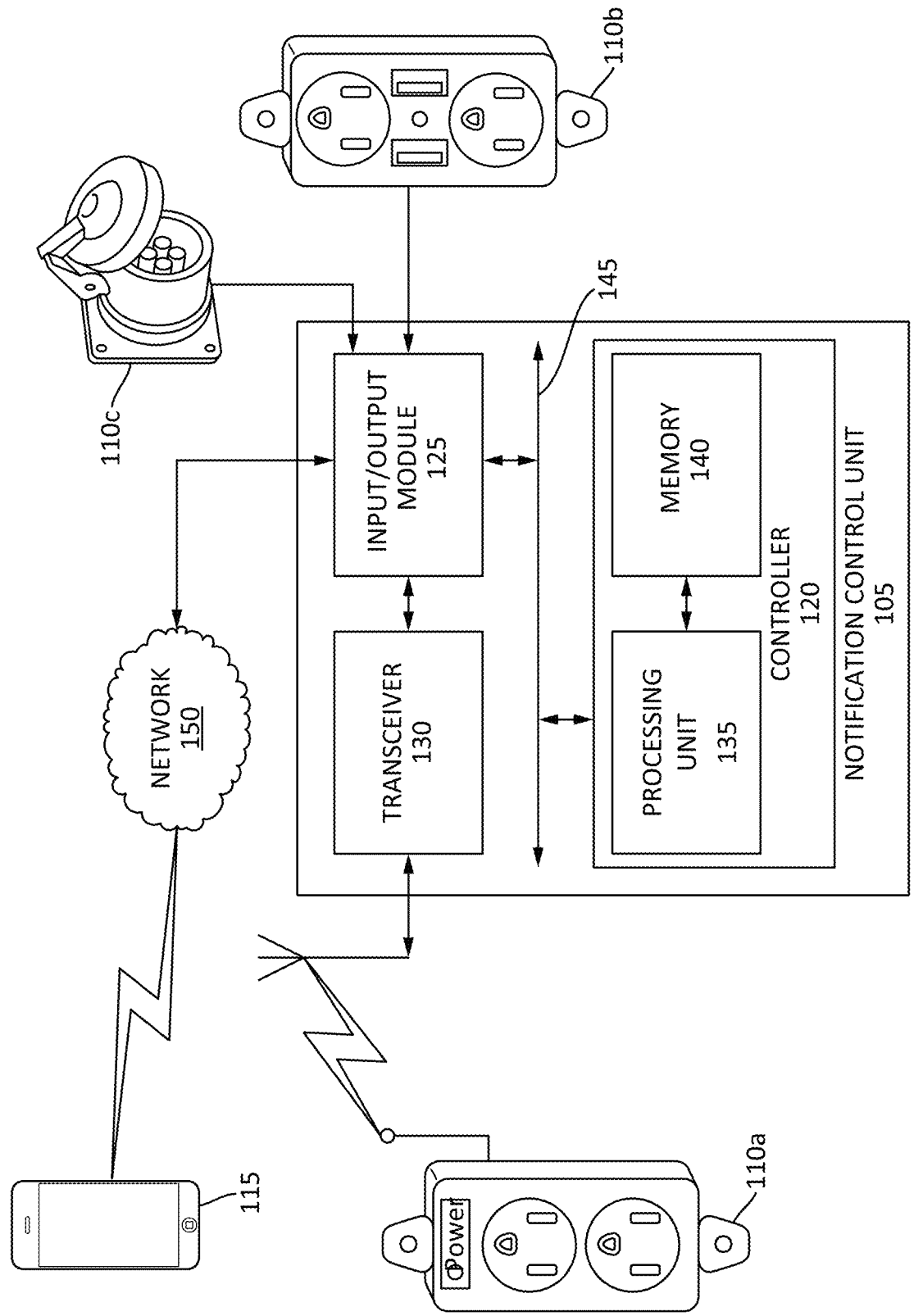
FIG. 1 is a block diagram illustrating a notification system according to some embodiments of the application.

FIG. 1 illustrates a notification system 100 according to some embodiments of the application. The notification system 100 includes a notification control unit 105, one or more power receptacles 110a-110c, and one or more user devices 115. In the illustrated embodiment, power receptacle 100a may communicate with the notification control unit 105 wirelessly, while power receptacles 110b, 110c may communicate with the notification control unit 105 via a wired connection. Further, as illustrated, power receptacles 110a may be a standard duplex receptacle, power receptacle 110b may be a duplex receptacle include Universal Serial Bus (USB) ports, and power receptacle 110c may be a low-voltage port (e.g., a class 2 low-voltage port). In other embodiments, power receptacles 110 may be, but are not limited to, 240-volt receptacles, Universal Serial Bus (USB) outlets, or power receptacles having a combination of various electrical ports. In some embodiments, the power receptacle 110 may include ground fault circuit interrupter (GFCI) circuitry and components. The one or more user devices 115 may include, but are not limited to, smart phones, tablets, laptop computers, or any internet-enabled devices.

The notification control unit 105 may include, among other things, a controller 120, an input/output module 125, and a transceiver 130. The controller 120 may include a processing unit 135 and a memory 140. The controller 120 may implement certain methods described herein.

It should be appreciated by those of ordinary skill in the art that FIG. 1 depicts the notification control unit 105 in a simplified manner, and an actual implementation may include suitably configured power components and processing logic to support known or conventional features. The components of the controller 120 may be communicatively coupled to one another via a local interface 145. The local interface 145 may include, for example, one or more buses or other connections.

The processing unit 135 is a hardware device for executing software instructions. The processing unit 135 may be a microprocessor or other similar device. The memory 140 includes, for example, a program storage area and a data storage area. The program storage area and the data storage area can include combinations of different types of memory, such as read-only memory (ROM), random access memory (RAM) or other suitable magnetic, optical, physical, or other non-transitory computer readable medium. The processing unit 135 is connected to the memory 140 and executes software instructions that are capable of being stored in a random access memory (RAM) of the memory 140 (e.g., during execution), a read-only memory (ROM) of the memory 140 (e.g., on a generally permanent basis). The software may include, one or more applications, program data, filters, rules, one or more program modules, and other executable instructions.

The input/output module 125 is configured to provide communication between the notification control unit 105 and outside devices. In the illustrated embodiment, the input/output module 125 provides communication between the notification control unit 105 and the one or more power receptacles 110a-110c. Additionally, in the illustrated embodiment, the input/output module 125 provides communication between the notification control unit 105 and the one or more user devices 115, through the network 150.

The transceiver 130, along with the transceiver antenna 155, enables wireless communication from the notification control unit 105 to, for example, the one or more power receptacles 110a. In other embodiments, rather than a transceiver 130 and transceiver antenna 155, the notification control unit 105 may include separate transmitting and receiving components, for example, a transmitter, a transmitting antenna, a receiver, and a receiving antenna. The wireless communication between the notification control unit 105 and the one or more power receptacles 110a may use a variety of different communications protocols, such as but not limited to, Bluetooth, ZigBee, Wifi, and a wireless personal area network (WPAN).

Figure 2:
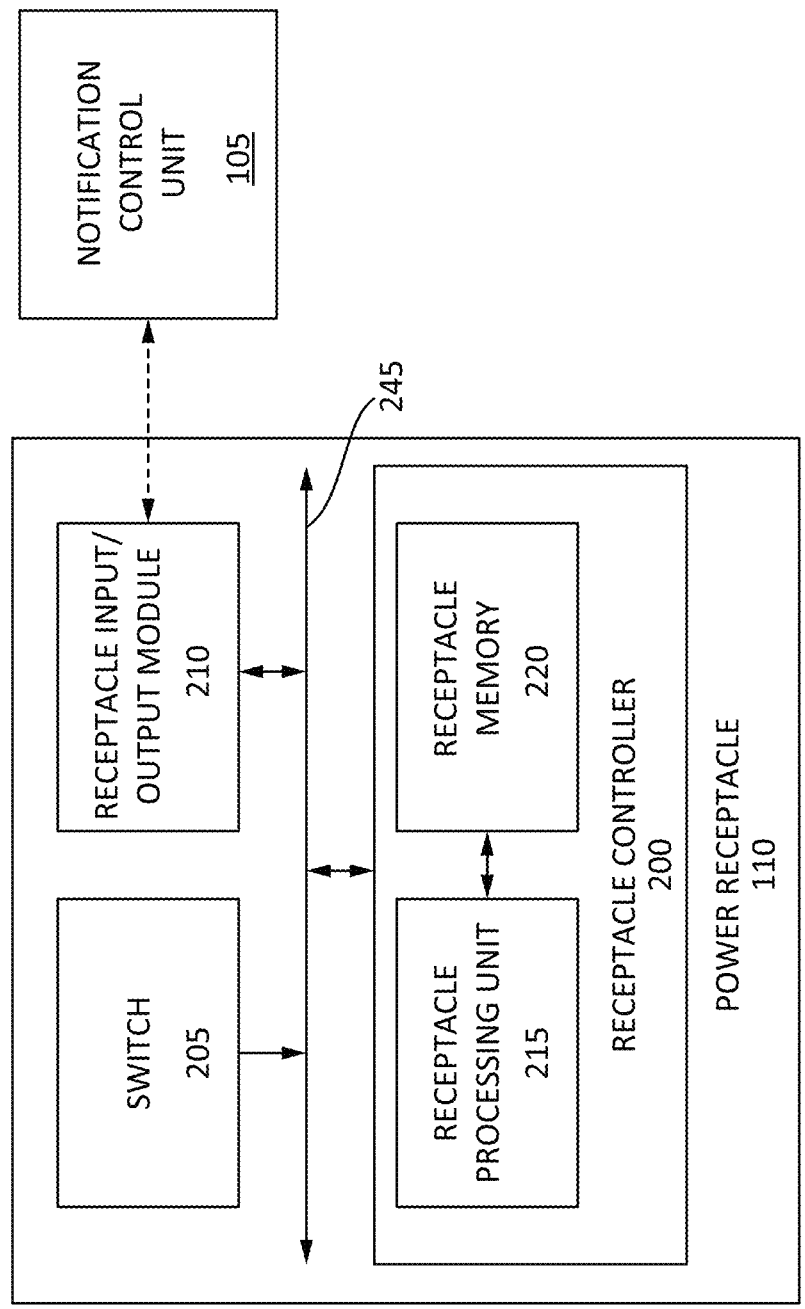
FIG. 2 is a block diagram of the power receptacle of the notification system of FIG. 1 according to some embodiments of the application.

FIG. 2 is a block diagram of the power receptacle 110 according to one embodiment of the application. It should be appreciated by those of ordinary skill in the art that FIG. 2 depicts the power receptacle 110 in a simplified manner, and an actual implementation may include suitably configured power components and processing logic to support known or conventional features. The power receptacle 110 includes a receptacle controller 200, one or switches 205, and a receptacle input/output module 210. The receptacle controller 200 includes a receptacle processing unit 215 and a receptacle memory 220. The components of the controller 120 may be communicatively coupled to one another via a receptacle local interface 245. The receptacle local interface 245 may include, for example, one or more buses or other connections.

The receptacle processing unit 215 is a hardware device for executing software instructions. The receptacle processing unit 215 may be a microprocessor or other similar device. The receptacle memory 220 includes, for example, a program storage area and a data storage area. The program storage area and the data storage area can include combinations of different types of memory, such as read-only memory (ROM), random access memory (RAM) or other suitable magnetic, optical, physical, or other non-transitory computer readable medium. The receptacle processing unit 215 is connected to the receptacle memory 220 and executes software instructions that are capable of being stored in a random access memory (RAM) of the receptacle memory 220 (e.g., during execution), a read-only memory (ROM) of the receptacle memory 220 (e.g., on a generally permanent basis). The software may include, one or more applications, program data, filters, rules, one or more program modules, and other executable instructions.

The one or more switches 205 are configured to determine a current state of the outlets (e.g., outlets 310a, 310b of FIG. 3) of the power receptacle 110 (e.g., an available state or an unavailable state) and output a signal corresponding to the current state. The one or more switches 205 may be, but are not limited to, toggle switches, push-button switches, or any other type of electrical switch.

The receptacle input/output module 210 is configured to provide communication between the receptacle 110 and the notification control unit 105. As discussed above, the communication may be wired or wireless. In some embodiments, the power receptacle 110 may include further components for providing wireless communication, such as a transceiver and transceiver antenna.

Figure 3:
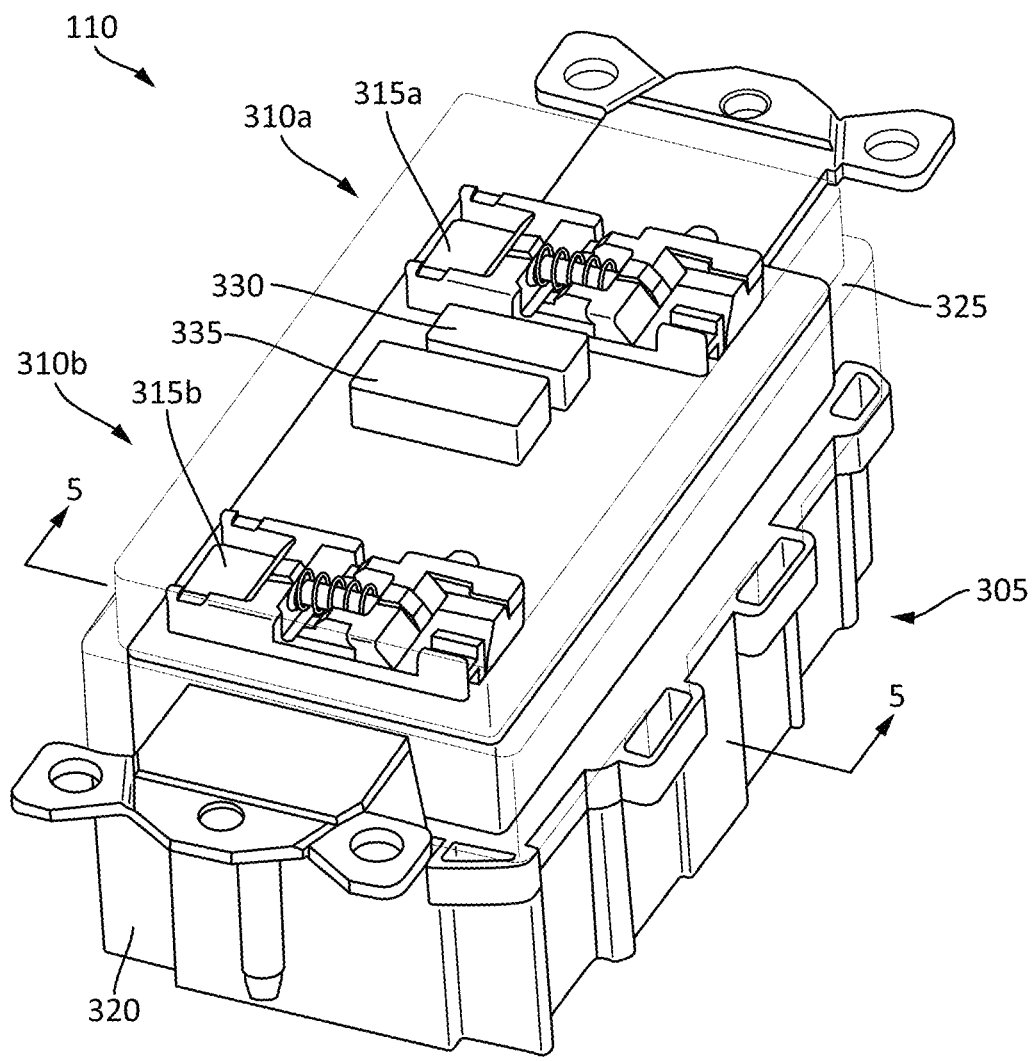
FIG. 3 is a perspective view of the power receptacle of FIG. 2 according to some embodiments of the application.

FIG. 3 is a perspective view of a power receptacle 110 according to some embodiments of the application. The power receptacle 110 includes a housing 305, one or more outlets 310a, 310b, and one or more shutters 315a, 315b. The housing 305 includes a rear cover 320 secured to a front cover 325. In some embodiments, such as illustrated, the front cover 325 includes openings for accommodating a RESET button 330 and a TEST button 335. Contained within the rear cover 320 and front cover 325 may be electrical and electronic components configured to receive and provide power to electrical devices 400 (FIG. 4) plugged into the one or more outlets 310. Further contained within the rear cover 320 and front cover 325 may be the components discussed above with respect to FIG. 2. In some embodiments, the one or more shutters 315a, 315b are tamper resistant (TR) shutter mechanisms. On a singular basis, one of the outlets may be referred to herein as outlet 110 while the shutters may be referred to herein as shutter 315.

Figure 4:
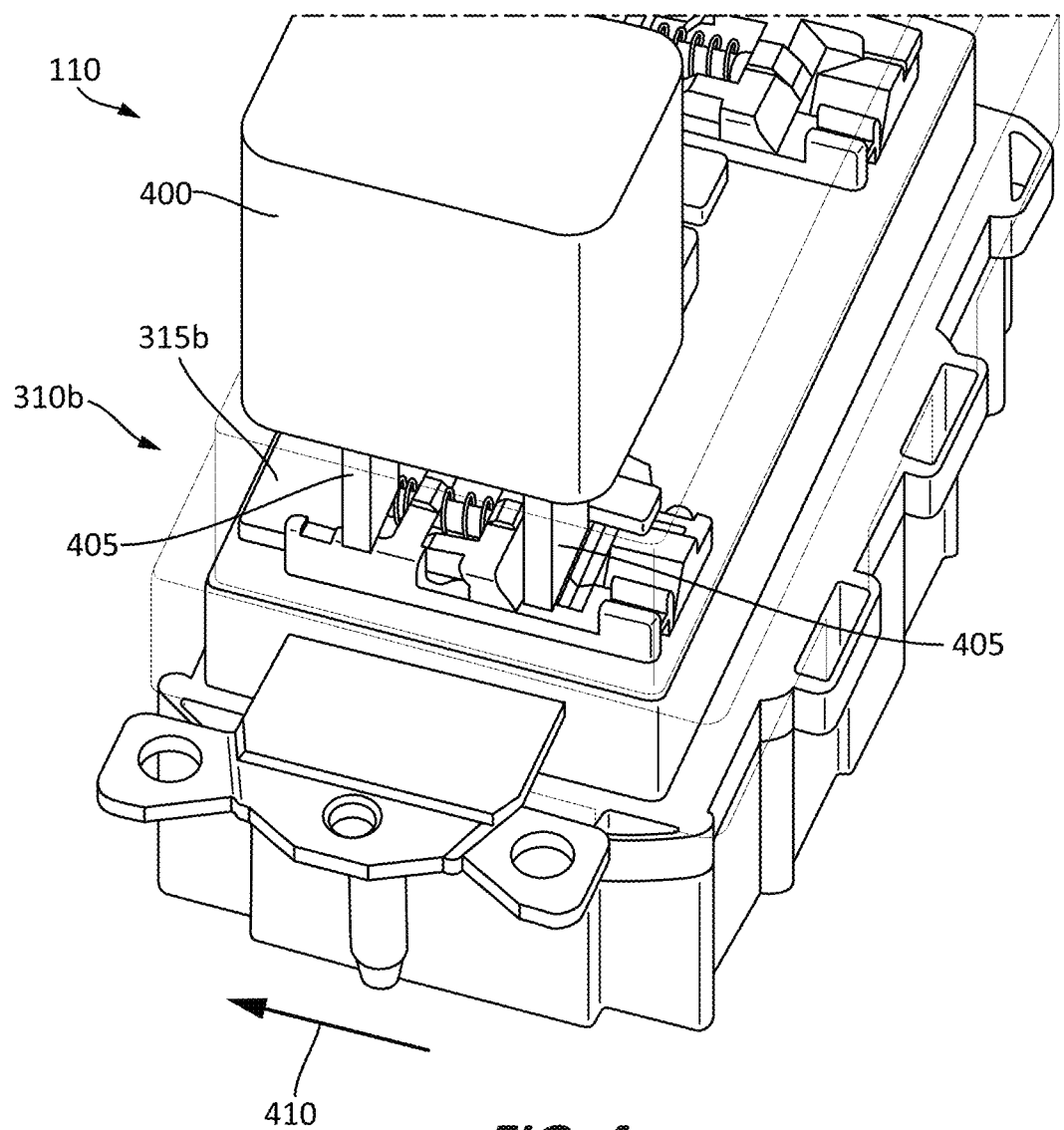
FIG. 4 is a perspective view of the power receptacle of FIG. 3 receiving an electrical device, according to some embodiments of the application.

FIG. 4 is a perspective view of the power receptacle 110 receiving an electrical device 400. As illustrated, as electrical device 400 is plugged into the outlet 310b, shutter 315b is moved in a first direction 410 from a closed position to an open position. When either shutter 315a, 315b is moved in the first direction 410 to the open position, respective outlet 310a, 310b is determined to be in the unavailable state.

Figure 5:
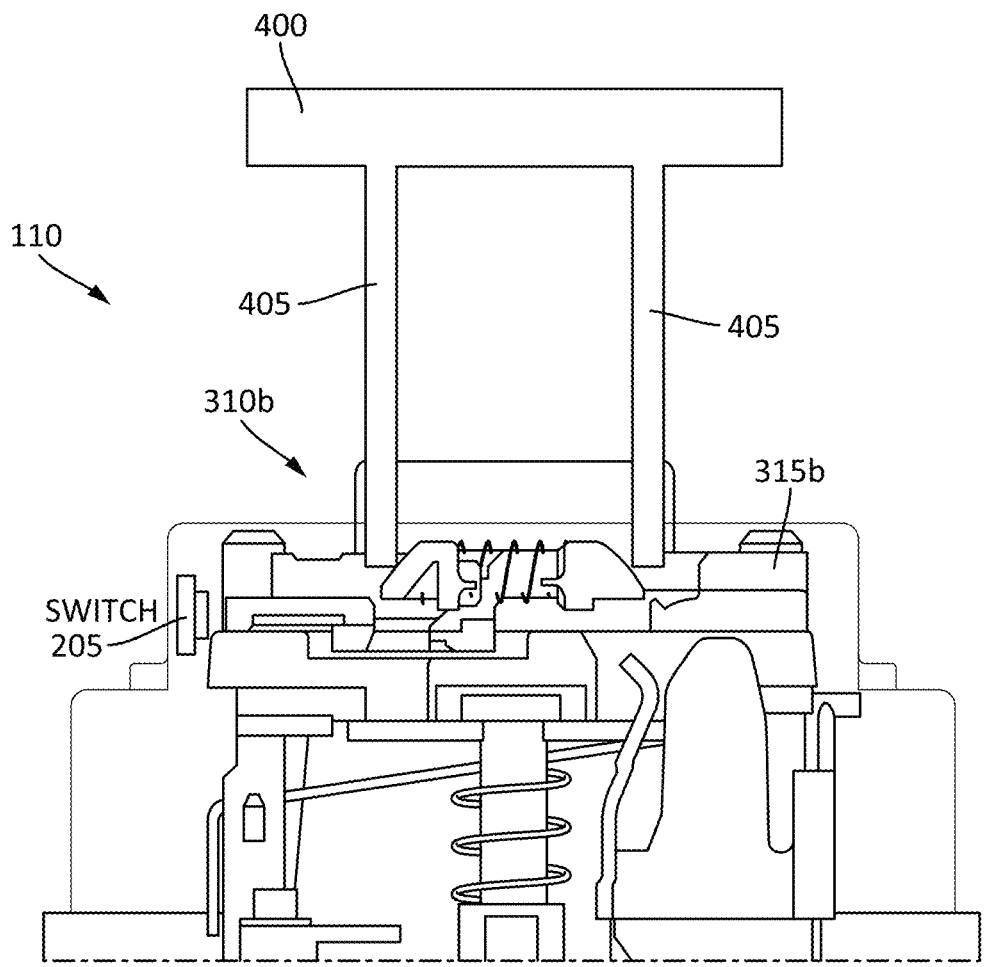
FIG. 5 illustrates a cross-sectional view of the power receptacle of FIG. 3 taken along line A-A, according to some embodiments of the application.
Figure 6:
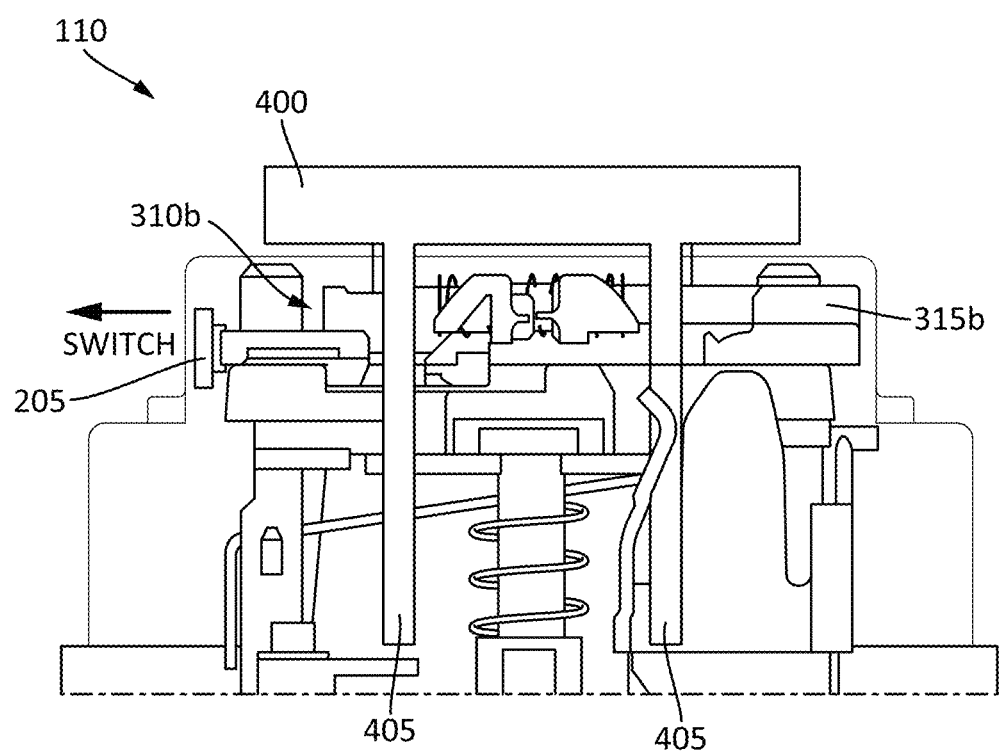
FIG. 6 illustrates a cross-sectional view of the power receptacle of FIG. 3, receiving an electrical device, taken along line A-A, according to some embodiments of the application.

FIGS. 5 and 6 illustrate a cross-sectional view of the power receptacle 110 taken along line A-A (FIG. 3). FIG. 5 illustrates the power receptacle 110 in the available state (e.g., the shutter 315b is in the closed position and the electrical device 400 is not plugged into the outlet 310b). When the shutter 315b is in the closed position, the shutter 315 is not in contact with switch 205 and switch 205 is not activated.

FIG. 6 illustrates the power receptacle 110 in the unavailable state (e.g., the shutter 315b is in the open position and the electrical device 300 is plugged into outlet 310b). When the shutter 315b is moved in the first direction 410 to the open position, the shutter 315b comes into contact with, and activates, switch 205. In some embodiments, the switch 205 is integrated into the shutter 315. Such an embodiment operates in a similar fashion to the embodiment of FIGS. 5 and 6.

Figure 7:
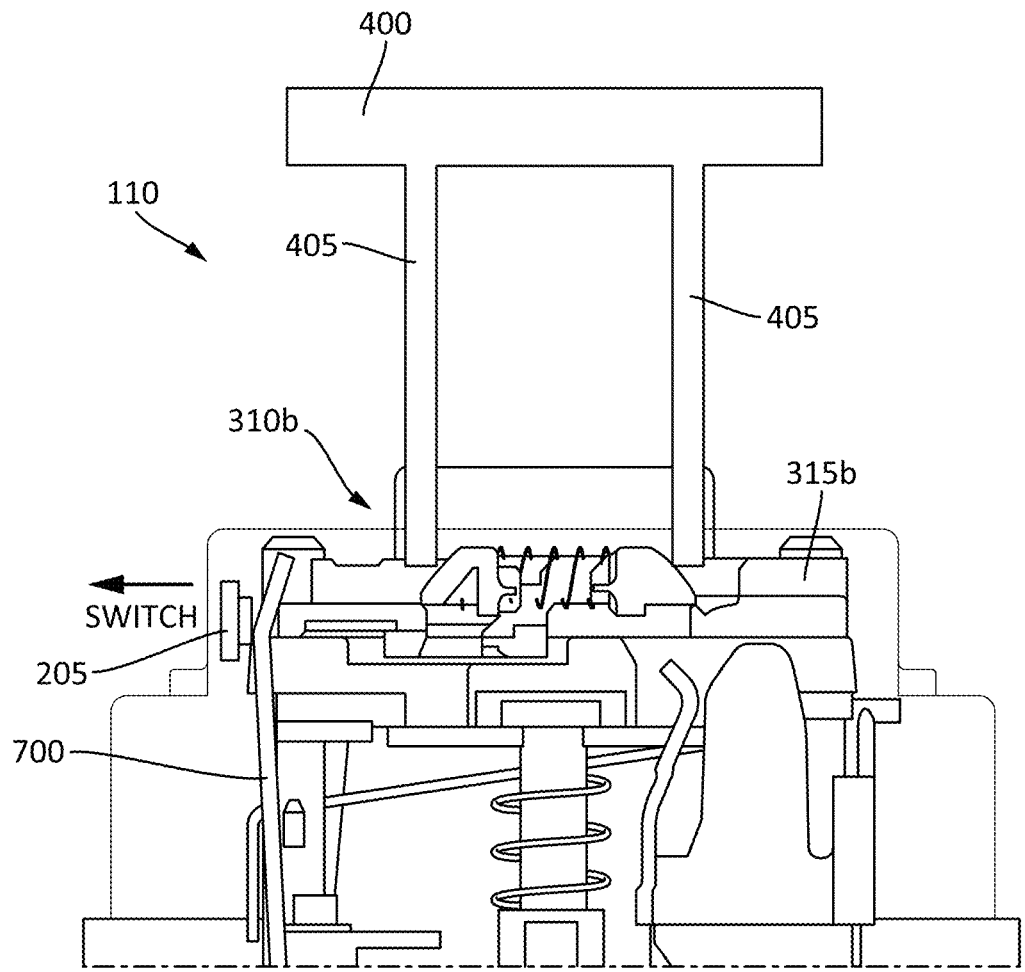
FIG. 7 illustrates a cross-sectional view of the power receptacle of FIG. 3 taken along line A-A, according to some embodiments of the application.

FIG. 7 illustrates a cross-section view of another embodiment of the power receptacle 110 taken along line A-A (FIG. 4). Such an embodiment further includes a switch arm 700. The switch arm 700 is configured to activate the switch 205 when the shutter 315b is moved in the first direction 410 to the open position. Outlet 310a and shutter 315a operate in a similar fashion as outlet 310b and shutter 315b discussed above with respect to FIGS. 5-7.

In some embodiments, the shutters 315a, 315b, receptacle controller 110, switches 205, and receptacle input/output module 210 are coupled to an interior of the front cover 325. In such an embodiment, the front cover 325 may be configured to releasably couple to an existing power receptacle. Such an embodiment, provides the same features as the power receptacle 110, discussed above, to a pre-installed power receptacle.

In operation, the power receptacle 110 is configured to output a signal respective of the current states (e.g., available or unavailable) of outlets 310a, 310b to the notification control unit 105. In some embodiments, the signal may include the type and number of available outlets or ports. The notification control unit 105 receives a plurality of signals from a plurality of power receptacles 110. The notification control unit 105 determines the current state of each power receptacle 110 according the received signals and outputs information concerning the current state of each power receptacle 110.

Figure 8:
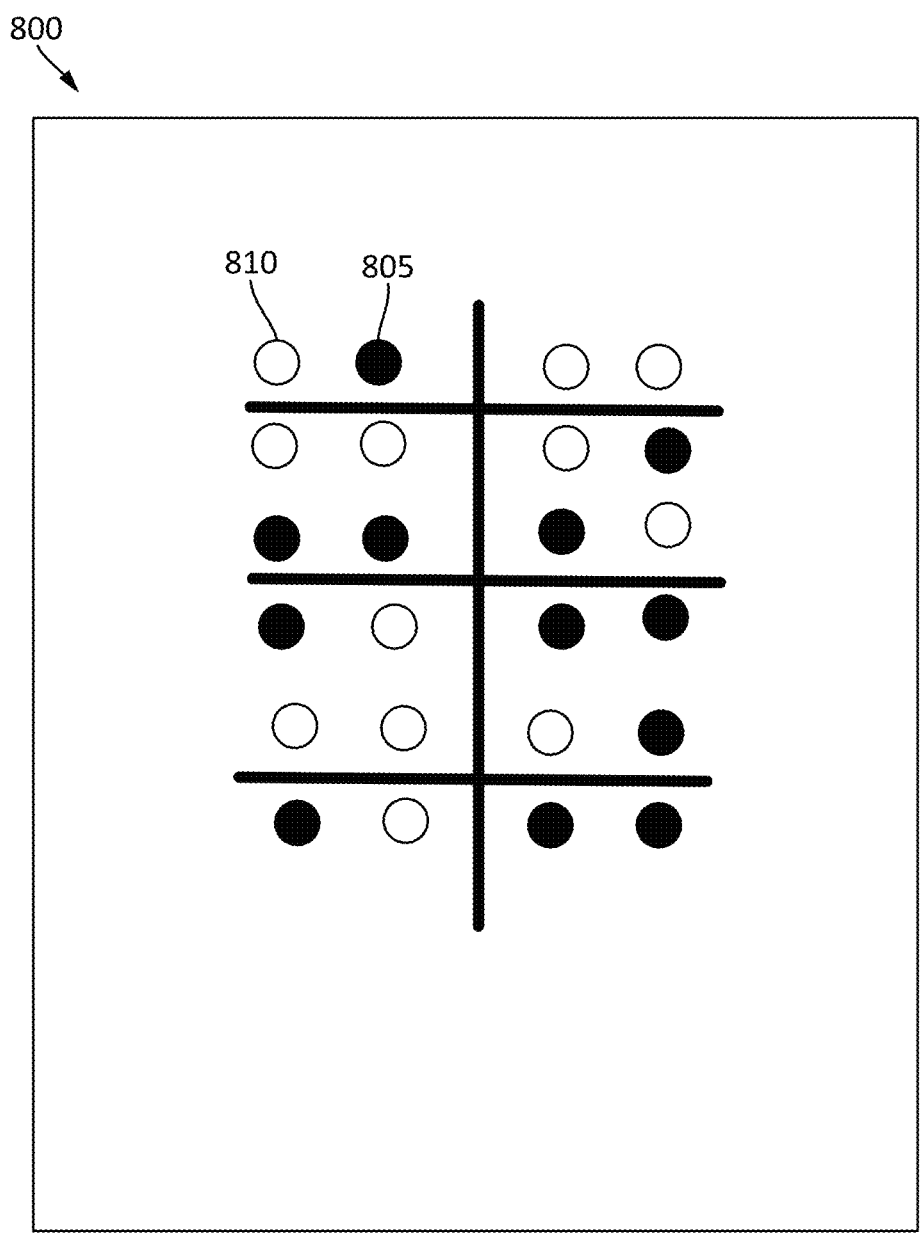
FIG. 8 illustrates a map displayed on a user device of the notification system of FIG. 1, according to some embodiments of the application.

FIG. 8 illustrates an exemplary map 800 according to some embodiments of the present application. The map 800 may illustrate a public location, such as but not limited to, an airport, a bus station, a train station, and a restaurant. The map 800 illustrates the location and availability of one or more power receptacles 110, as well as their state, at a location. For example, in the illustrated embodiment, a filled circle 805 may indicate an unavailable power receptacle 110, while an unfilled circle 810 may indicate an available power receptacle 110.

In some embodiments, the map 800 further illustrates information concerning the power receptacles 110. For example, the map 800 may further provide a user with the type of power receptacle 110, as well as a number of available outlets, or port, of the one or more power receptacles 110. As discussed above, the map 800 may be sent to, or accessed by, the one or more user devices 115.

Figure 9A:
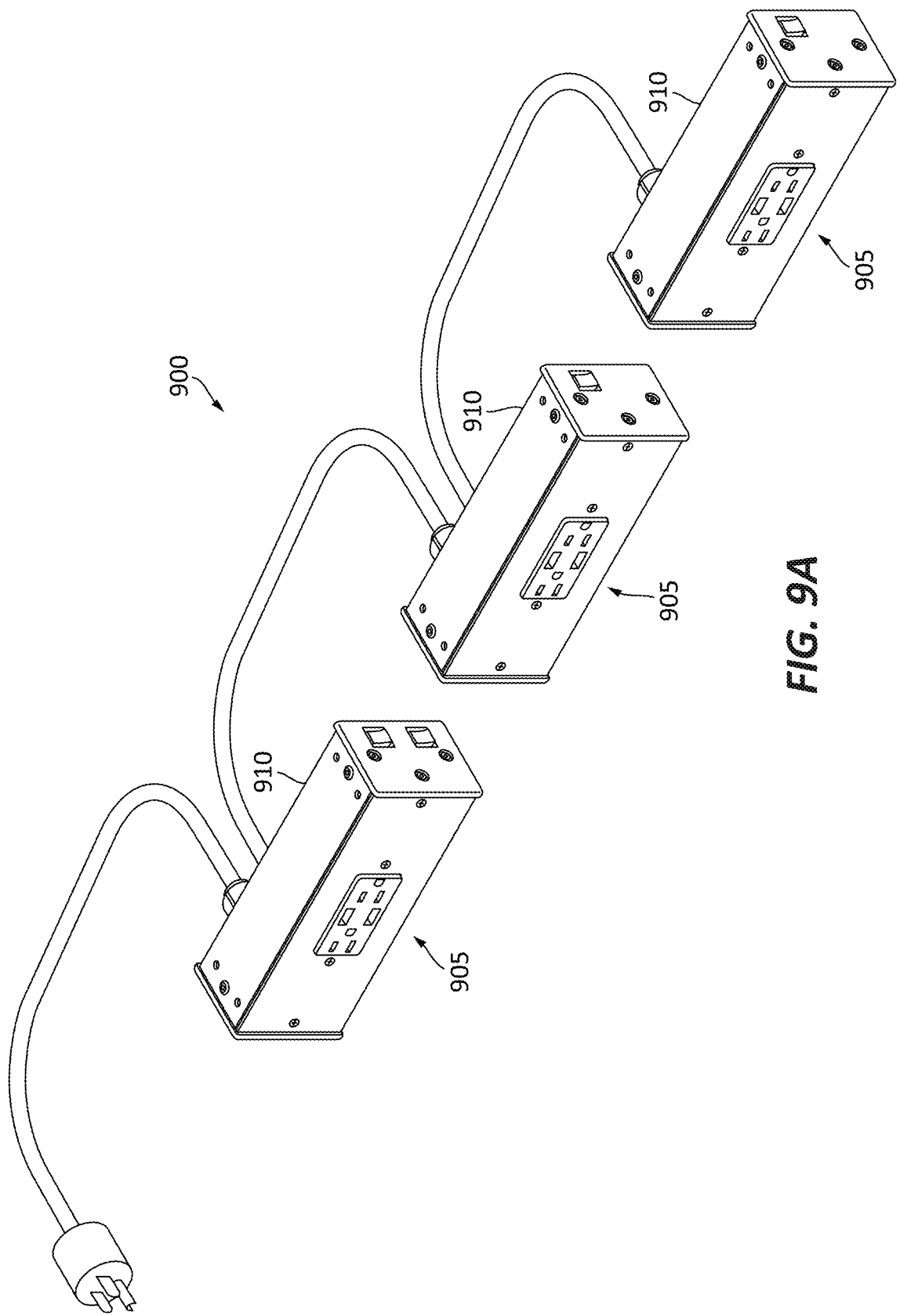
FIG. 9A is a front perspective view of a notification system according to another embodiment of the application.
Figure 9B:
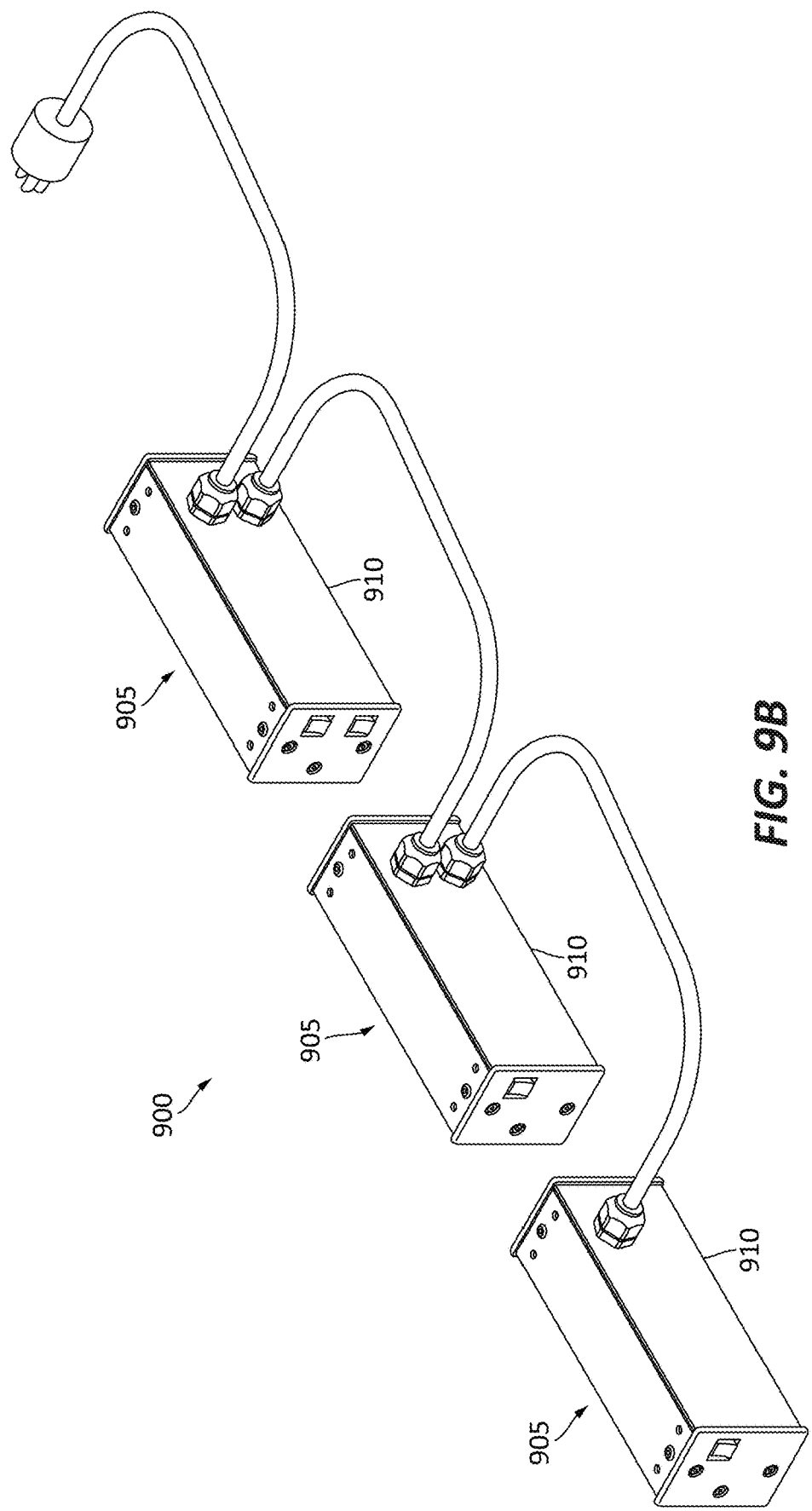
FIG. 9B is a rear perspective view of the notification system of FIG. 9A according to some embodiments of the application.

FIGS. 9A & 9B illustrate a notification system 900 according to some embodiments of the application. The notification system 900 includes a plurality of power receptacles 905 each housed within a power receptacle housing 910. In some embodiments, the notification system 900 and the plurality of power receptacles 905 may include similar components, and function in a similar, as notification system 100 and power receptacles 110, discussed above.

In some embodiments, each power receptacle 905 includes a circuit breaker for protecting the power receptacle 905 from, among other things, overcurrent. In such an embodiment, when one or more power receptacles 905 are placed in a tripped condition by the respective circuit breaker, the notification system 900 may output a notification. Such a notification may be output in a similar manner as discussed above with respect to the receptacle input/output module 210 of FIG. 2.

As illustrated, in some embodiments, the power receptacles 905 are electrically connected together. In some embodiments, the power receptacles 905 may be electrically connected in a "daisy-chain" configuration, such that if one of the power receptacles 905 is placed in a tripped condition, all of the power receptacles 905 of the notification system 900 are placed in a tripped condition. In other embodiments, the power receptacle 905 may be electrically connected in a "parallel-type" configuration, such that if one of the power receptacles 905 is placed in a tripped condition, the other power receptacles 905 of the notification system 900 remain in a non-tripped condition.

Figure 10A:
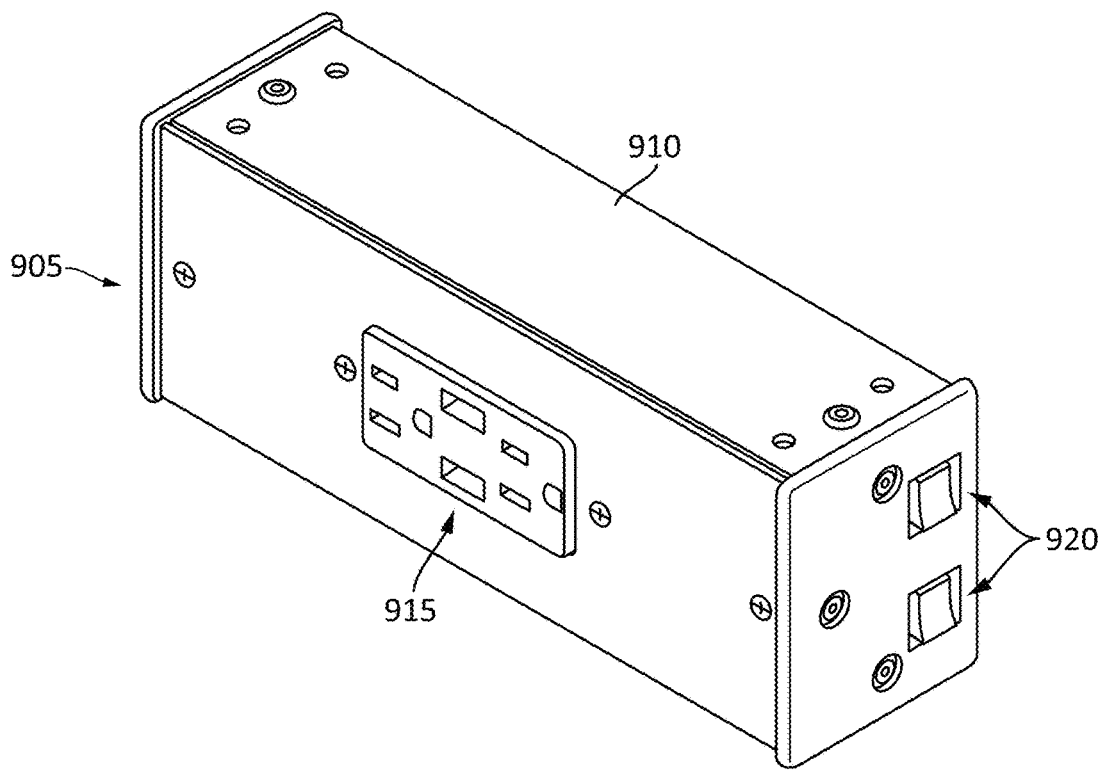
FIG. 10A is a front perspective view of a power receptacle of FIG. 9A according to some embodiments of the application.
Figure 10B:
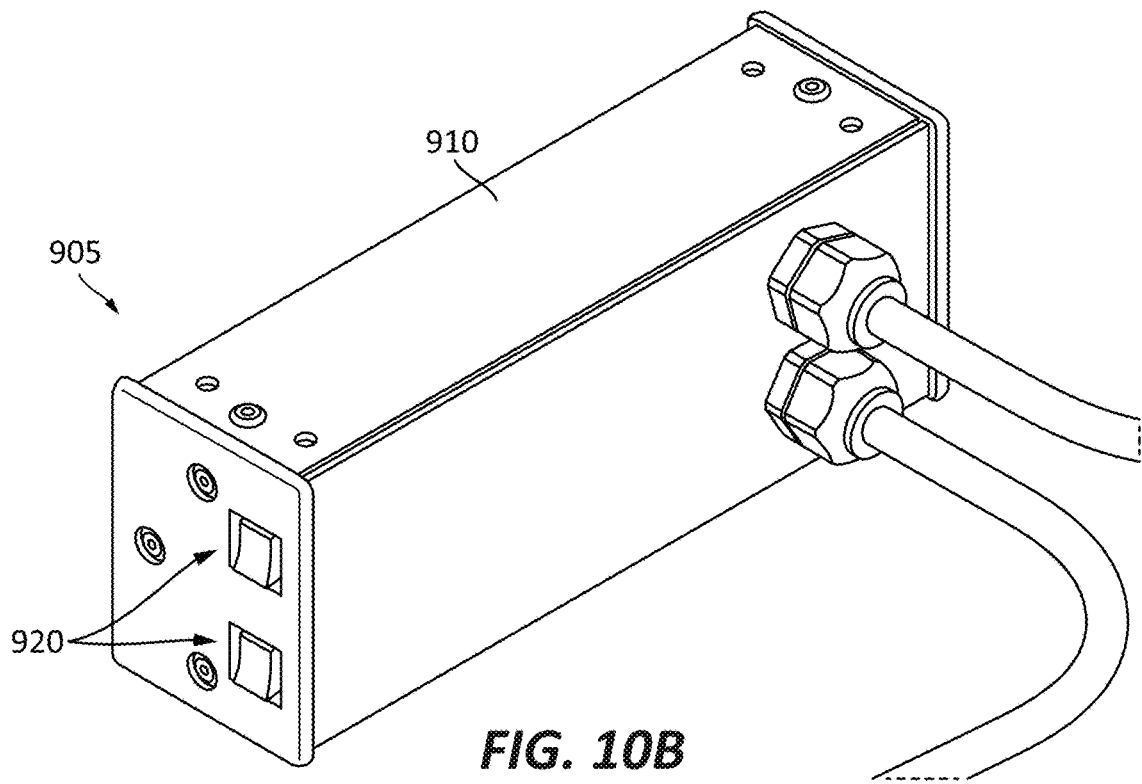
FIG. 10B is a rear perspective view of the power receptacle of FIG. 10A according to some embodiments of the application.

FIGS. 10A & 10B illustrate a power receptacle 905 of the notification system 900. The power receptacle 905 includes one or more outlets 915 and one or more user-inputs 920. In some embodiments, the outlets 915 are substantially similar to outlets 310a, 310b, discussed above. The user-inputs 920 may be a power button, a RESET button, and/or a TEST button. Although not illustrated, in some embodiments, the power receptacles 905 further includes one or more shutters 315 (FIGS. 3-7).

Thus, the invention provides, among other things, a power receptacle configured to output an availability state. In some embodiments, the availability state is received by a notification control unit. The notification control unit is configured to output the availability of one or more power receptacles to a user device. Various features and advantages of the invention are set forth in the following claims.

What is claimed is:

1. A notification system comprising:
   an outlet configured to output a signal indicative of the availability of the outlet; and
   a notification control unit configured to
     receive the signal,
     determine availability of the outlet based on the signal, and
     output information corresponding to the availability of the outlet to at least one selected from a group consisting of a computer, a smart phone, and a tablet,
   wherein the information corresponding to the availability of the outlet is included in a map accessed by the at least one selected from the group consisting of a computer, a smart phone, and a tablet.

2. The notification system of claim 1, wherein the signal is output via at least one selected from the group consisting of a wired connection and a wireless connection.

3. The notification system of claim 1, wherein the outlet is at least one selected from the group consisting of a duplex outlet, a low-voltage outlet, and a universal serial bus (USB) outlet.

4. The notification system of claim 1, wherein the outlet includes a switch configured to determine a state of the outlet.

5. The notification system of claim 4, wherein the switch outputs a second signal to the electronic processor corresponding to the state of the outlet.

6. The notification system of claim 4, wherein the outlet further includes a shutter configured to activate the switch.

7. The notification system of claim 1, wherein the map illustrates a site in which the outlet is located.

8. A method of providing an availability status of an outlet of an electrical receptacle, the method comprising:
   outputting, from the electrical receptacle, a signal indicative of the availability of the outlet; and
   displaying, via at least one selected from a group consisting of a computer, a smart phone, and a tablet, a map illustrating an availability status of the outlet.

9. The method of claim 8, wherein the step of outputting, from the electrical receptacle, the signal is performed via a wired or wireless connection.

10. The method of claim 8, wherein the electrical receptacle is at least one selected from the group consisting of a duplex outlet, a low-voltage outlet, and a universal serial bus (USB) outlet.

11. The method of claim 8, wherein the signal is output when a switch is activated.

12. The method of claim 11, wherein a shutter activates the switch.

13. The method of claim 8, wherein the map illustrates a site in which the outlet is located.

14. A notification system comprising:
   an outlet configured to output a signal indicative of the availability of the outlet; and
   a notification control unit configured to
      receive the signal,
      determine availability of the outlet based on the signal, and
      output information corresponding to the availability of the outlet to at least one selected from a group consisting of a computer, a smart phone, and a tablet,
   wherein the notification system associates the information corresponding to the availability of the outlet with location information corresponding to the outlet.

15. The notification system of claim 14, wherein the outlet is at least one selected from the group consisting of a duplex outlet, a low-voltage outlet, and a universal serial bus (USB) outlet.

16. The notification system of claim 14, wherein the signal is output via a wireless connection.

17. The notification system of claim 14, wherein the signal is output when a switch is activated.

18. The notification system of claim 17, wherein a shutter activates the switch.

19. The notification system of claim 14, wherein data indicating the type of outlet is associated with the location information.

20. The notification system of claim 14, wherein the map indicates a type of outlet for each outlet site.

\* \* \* \* \*